[19] United States Patent
Nishimoto

[11] Patent Number: 5,317,443
[45] Date of Patent: May 31, 1994

[54] OPTICAL TRANSMITTER
[75] Inventor: Hiroshi Nishimoto, Kawasaki, Japan
[73] Assignee: Fujitsu Limited, Kawasaki, Japan
[21] Appl. No.: 799,158
[22] Filed: Nov. 27, 1991
[30] Foreign Application Priority Data
Nov. 27, 1990 [JP] Japan .................................. 2-320771
[51] Int. Cl.$^5$ .......................................... H04B 10/04
[52] U.S. Cl. .................................. 359/187; 359/181; 372/26
[58] Field of Search ............................. 359/180–183, 359/187; 372/26, 28, 29, 31, 32

[56] References Cited

U.S. PATENT DOCUMENTS

| | | | |
|---|---|---|---|
| 4,471,494 | 9/1984 | Keil | 359/187 |
| 4,805,235 | 2/1989 | Henmi | 359/187 |
| 5,025,487 | 6/1991 | Eichen | 359/181 |
| 5,161,044 | 11/1992 | Nazarathy | 359/187 |

FOREIGN PATENT DOCUMENTS

| | | |
|---|---|---|
| 0343725 | 11/1989 | European Pat. Off. . |
| 2847182 | 5/1980 | Fed. Rep. of Germany . |
| 2168561A | 6/1986 | United Kingdom . |

OTHER PUBLICATIONS

"Fiber Transmission Properties of Optical Pulses Produced Through Direct Phase Modulation of DFB Laser Diode," Shirasaki et al., Electronics Letters, vol. 24, No. 8, Apr. 14, 1988, Enage GB, pp. 486–488.

"Field Demonstration of FSK Transmission at 2,488 Gbit/s Over A 132km Submarine Cable Using an Erbium Power Amplifier," E. G. Bryant et al., Topical Meeting on Optical Amplifiers and Their Applications, 1990, pp. 152–155.

Primary Examiner—Richard E. Chilcot, Jr.
Assistant Examiner—Leslie Pascal
Attorney, Agent, or Firm—Staas & Halsey

[57] ABSTRACT

An optical transmitter operates on the DPSH-IM (direct phase-shift and self-homodyne intensity modulation) principle. The optical transmitter slightly amplitude-modulates the modulation current of a laser diode using a low frequency signal and detects the modulated component from the optical output. These features stabilize the operating point and improve the transmission waveform.

21 Claims, 12 Drawing Sheets

Frequency

Phase

Phase difference

Intensity time

OPTICAL TRANSMITTER

BACKGROUND OF THE INVENTION

1. Field of the Invention

The present invention relates to an optical transmitter for use with an optical fiber communication system.

Recently, the so-called DPSH-IM (direct phase-shift and self-homodyne intensity modulation) has been proposed as a modulation method which is highly immune to the effect of wavelength dispersion and which dissipates low levels of modulation driving power compared with other methods. The DPSH-IM works as follows: Varying the injection current of a laser diode first modulates the oscillated light waves therefrom in phase. The phase-modulated light is then converted into intensity-modulated light by a self-homodyne arrangement. With the DPSH-IM, a Mach-Zehnder interferometer provides the self-homodyne capability. This requires stabilizing the operating point involved in order to prevent waveform distortion. Furthermore, to address the fluctuation in the frequency modulation efficiency of the laser diode requires controlling the driving amplitude involved.

Meanwhile, optical transmitters for coherent light wave communication, to which the so-called CP-FSK is applied, also require control over the driving amplitude. Optical transmitters in which the light from a constantly driven laser diode is intensity-modulated by a Mach-Zehnder optical modulator require control over the operating point and driving amplitude.

2. Description of the Related Art

Under the DPSH-IM method, a laser diode fed with a bias current larger than a threshold current is supplied with modulation current pulses of a small amplitude for phase-modulating the oscillated light. The phase-modulated light is converted by passage through an optical interferometer into intensity-modulated light. The operating principle of the DPSH-IM is described in more detail in "Fibre Transmission Properties of Optical Pulses Produced Through Direct Phase Modulation of DFB Laser Diode" by Shirasaki M., Nishimoto H., Okiyama T and Touge T (ELECTRONICS LETTERS, 14th Apr., 1988, Vol. 24, No. 8, pp. 486-488). One PCT application related to the DPSH-IM is PCT/JP89/00220.

The DPSH-I permits small amplitude modulation of the laser diode under large bias currents. This makes it possible to construct a system highly immune to the adverse effects of chirping and operating on low driving voltages.

In a DPSH-IM setup, slight changes in the oscillation frequency of the laser diode or in the delay time difference of the optical interferometer cause the optical signal from an optical interferometer to be distorted or inverted in polarity. The oscillation frequency of the laser diode and the delay time difference of the optical interferometer are known to vary depending on temperature and aging characteristics. Thus where an optical transmitter based on the DPSH-IM is used for practical purposes, it is necessary to control the oscillation frequency of the laser diode or the delay time difference of the optical interferometer in order to stabilize the operating point. Stabilization of the operating point is needed to prevent waveform distortion and polarity inversion in signals. A simple prior art description about how to stabilize the operating point is found in "Field Demonstration of FSK Transmission at 2.488 Giga- bits/second over a 132 km Submarine Cable Using an Erbium Power Amplifier" by E. G. Bryant et al. (Topical Meeting on Optical Amplifiers and Their Applications, 1990, pp. 152-155). According to the above publication, the operating point is stabilized apparently by having the bias current of a laser diode modulated with a small signal of 10 kHz and by having the output light from an optical interferometer monitored in order to control the bias current.

The rate of fluctuation in the oscillation frequency (FM efficiency) with respect to the amplitude of the current for driving the laser diode is predictably varied depending on the temperature and aging characteristics of the laser diode. Thus, in order to prevent waveform distortion, it is necessary to ensure continuous control of the oscillation frequency based on the driving currents of an appropriate amplitude.

SUMMARY OF THE INVENTION

It is therefore an object of the present invention to provide an optical transmitter which operates on the DPSH-IM principle and which stabilizes the operating point to prevent waveform distortion and polarity inversion of signals.

It is another object of the invention to provide an optical transmitter which operates on the DPSH-IM principle and which controls driving amplitude to prevent waveform distortion.

It is a further object of the invention to provide an optical transmitter which is constructed for coherent light wave communication and which stabilizes driving amplitude.

It is an even further object of the invention to provide an optical transmitter which comprises a constantly driven laser diode and a Mach-Zehnder optical modulator and thereby stabilizes the operating point and driving amplitude.

In carrying out the invention and according to one aspect thereof, there is provided an optical transmitter comprising: a laser diode; a bias circuit for supplying a bias current to the laser diode; a driving circuit for supplying the laser diode with a modulation current in accordance with an input signal, the modulation current being supplied in such a manner that the integral value of the oscillation frequency of the laser diode, varied in one time slot by the modulation current, reaches a phase amount of one of $k\pi$ and $-k\pi$, "k" being at least 1; a Mach-Zehnder optical interferometer for converting angle-modulated light coming from the laser diode into intensity-modulated light, the interferometer having a delay time difference corresponding to $1/k$ of one time slot; an optical branching circuit for branching the signal light from the Mach-Zehnder interferometer; a first oscillator for slightly amplitude-modulating the modulation current using a first low frequency signal; a first amplitude detector for detecting the amplitude and polarity of the frequency component of the first low frequency signal contained in the signal light branched by the optical branching circuit; and an operating point control circuit for increasing or decreasing, depending on the polarity detected by the first amplitude detector, the phase difference given upon interference by multiplying the oscillation frequency by the delay time difference, whereby control is effected so that the amplitude detected by the first amplitude detector reaches zero.

In a preferred structure according to the invention, the modulation current is amplitude-modulated using the first low frequency signal in such manner that in the waveform of the modulation current, the envelope on the space side and the envelope on the mark side are opposite to each other in phase and are the same in amplitude.

In a further preferred structure according to the invention, the optical transmitter further comprises: a second oscillator for slightly modulating the bias current using a second low frequency signal having a frequency different from that of the first low frequency signal; a second amplitude detector for detecting the amplitude and polarity of the frequency component of the second low frequency signal contained in the signal light branched by the optical branching circuit; and a driving amplitude control circuit for increasing or decreasing the amplitude of the modulation current depending on the polarity detected by the second amplitude detector, whereby control is effected so that the amplitude detected by the second amplitude detector reaches zero.

According to another aspect of the invention, there is provided an optical transmitter comprising: a laser diode; a bias circuit for supplying a bias current to the laser diode; a driving circuit for supplying the laser diode with a modulation current in accordance with an input signal, the modulation current being supplied in such a manner that the laser diode is frequency-modulated o phase-modulated; an optical branching circuit for branching the signal light from the laser diode; a Mach-Zehnder optical interferometer for converting the signal light branched by the optical branching circuit into intensity-modulated light; a first oscillator for slightly amplitude-modulating the modulation current using a first low frequency signal; a first amplitude detector for detecting the amplitude and polarity of the frequency component of the first low frequency signal contained in the intensity-modulated light from the Mach-Zehnder optical interferometer; an operating point control circuit for increasing or decreasing the bias current depending on the polarity detected by the first amplitude detector, whereby control is effected so that the amplitude detected by the first amplitude detector reaches zero; a second oscillator for slightly modulating the bias current using a second low frequency signal having a frequency different from that of the first low frequency signal; a second amplitude detector for detecting the amplitude and polarity of the frequency component of the second low frequency signal contained in th intensity-modulated light from the Mach-Zehnder optical interferometer; and a driving amplitude control circuit for increasing or decreasing the amplitude of the modulation current depending on the polarity detected by the second amplitude detector, whereby control is effected so that the amplitude detected by the second amplitude detector reaches zero.

According to a further aspect of the invention, there is provided an optical transmitter comprising: a laser diode; a bias circuit for supplying a bias current to the laser diode; a Mach-Zehnder optical modulator for intensity-modulating the light from the laser diode; a driving circuit for supplying the Mach-Zehnder optical modulator with a modulation signal in accordance with an input signal; an optical branching circuit for branching the signal light from the Mach-Zehnder optical modulator; a first oscillator for slightly amplitude-modulating the modulation signal for the Mach-Zehnder optical modulator using a first low frequency signal; a first amplitude detector for detecting the amplitude and polarity of the frequency component of the first low frequency signal contained in the signal light branched by the optical branching circuit; an operating point control circuit for increasing or decreasing the bias voltage of the Mach-Zehnder optical modulator depending on the polarity detected by the first amplitude detector, whereby control is effected so that the amplitude detected by the first amplitude detector reaches zero; a second oscillator for slightly modulating the bias voltage of the Mach-Zehnder optical modulator using a second low frequency signal having a frequency different from that of the first low frequency signal; a second amplitude detector for detecting the amplitude and polarity of the frequency component of the second low frequency signal contained in the signal light branched by the optical branching circuit; and a driving amplitude control circuit for increasing or decreasing the amplitude of the modulation signal fed to the Mach-Zehnder optical modulator depending on the polarity detected by the second amplitude detector, whereby control is effected so that the amplitude detected by the second amplitude detector reaches zero.

The invention modulates the amplitude of the modulation current supplied to the laser diode for operating point control. This is a feature that clearly separates the invention from the prior art espoused by Bryant et al., the latter modulating the bias current of the laser diode to stabilize the operating point.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

The preferred embodiments of the invention will now be described in detail with reference to the accompanying drawings.

Figure 1:
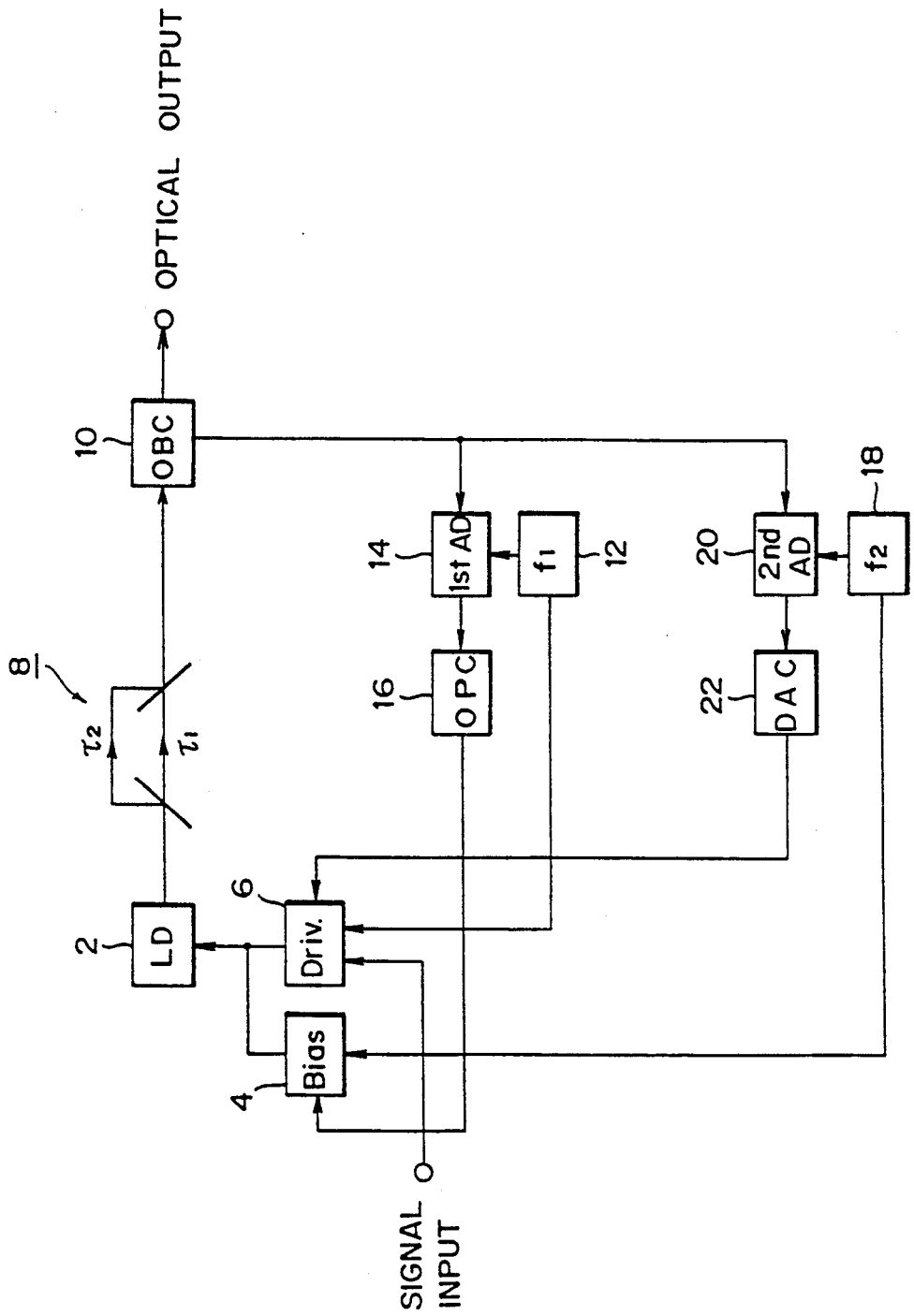
FIG. 1 is a block diagram of an optical transmitter practiced as a first embodiment of the invention.

FIG. 1 is a block diagram of the optical transmitter practiced as the first embodiment of the invention. In FIG. 1, reference numeral 2 is a laser diode; 4 is a bias circuit that supplies a bias current to the laser diode 2; 6 is a driving circuit that supplies the laser diode 2 with a modulation current (pulses) in accordance with an input signal; and 8 is a Mach-Zehnder (MZ) optical interferometer that converts the phase-modulated light coming from the laser diode 2 to intensity-modulated light.

The bias current is set to be larger than the oscillation threshold value of the laser diode 2. The amplitude and pulse width of the modulation current are set in such a manner that the integral value of the oscillation frequency of the laser diode 2, varied in one time slot by the modulation current, reaches a phase amount of $\pi$ or $-\pi$.

Figure 2:
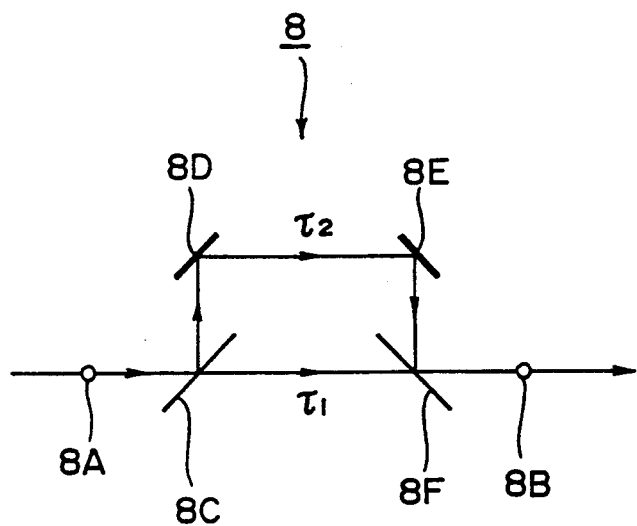
FIG. 2 is a view outlining how a Mach-Zehnder optical interferometer works.

As depicted in FIG. 2, the MZ optical interferometer 8 receives light through an input port 8A and gets the light branched into a first and a second optical path. Light portions passing through the first and the second optical paths are made to interfere with each other before being output via an output port 8B. The first optical path is traveled by the light that enters the input port 8A, is transmitted through half mirrors 8C and 8F, in that order, and reaches the output port 8B. The second optical path is traveled by the light that enters the input port 8A, is reflected by the half mirror 8C, mirrors 8D and 8E and the half mirror 8F, in that order, and reaches the output port 8B. The propagation delay time difference between the first and the second optical paths is illustratively set for a time period corresponding to one time slot of the input signal.

In FIG. 1, reference numeral 10 is an optical branching circuit that branches the signal light coming from the MZ optical interferometer 8. One of the branched light portions is sent over an optical transmission path, not show, and the other branched light portion is used for control over the operating point and driving amplitude.

In a feedback loop for operating point control, reference numeral 12 is a first oscillator that slightly amplitude-modulates the modulation current using a first low frequency signal; 14 is a first amplitude detector that detects the amplitude and polarity of the frequency component of the first low frequency signal contained in the signal light; and 16 is an operating point control circuit that increases or decreases the bias current depending on the polarity detected by the first amplitude detector 14, whereby control is effected in such a manner that the amplitude detected by the first amplitude detector 14 reaches zero.

In a feedback loop for driving amplitude control, reference numeral 18 is a second oscillator that slightly amplitude-modulates the bias current using a second low frequency signal having a frequency different from that of the first low frequency signal; 20 is a second amplitude detector that detects the amplitude and polarity of the frequency component of the second low frequency signal contained in the signal light; and 22 is a driving amplitude control circuit that increases or decreases the amplitude of the modulation current depending on the polarity detected by the second amplitude detector 20, whereby control is effected in such a manner that the amplitude detected by the second amplitude detector 20 reaches zero. The period of the first low frequency signal and that of the second are each set for a time period sufficiently longer than one time slot of the modulation current.

Described below is the operating principle of the DPSH-IM with reference to FIGS. 3A through 3D.

The output of the MZ optical interferometer depends on the phase difference between the light waves that occur when the light portion from the first optical path interferes with that from the second. If the phase difference were fixed to $\pi$ (or $(2n+1)\pi$, n being an integer), no power would be output. When the phase of the optical waves entering the MZ optical interferometer 8 varies within one time slot, the output intensity also varies.

Figure 3A:
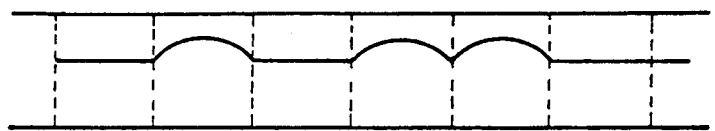
FIGS. 3A through 3D are views depicting the operating principle of the DPSH-IM.

The oscillation frequency of the laser diode 2 varies in keeping with the injection current applied thereto. Thus the waveform of the modulation current pulses is reflected in the frequency change of the light waves from the laser diode 2. FIG. 3A is a waveform chart illustrating the frequency transition in the form of an RZ type waveform. The RZ type simply means that the signal level returns to zero in each time slot of modulation; the duty ratio may be arbitrary.

Figure 3B:
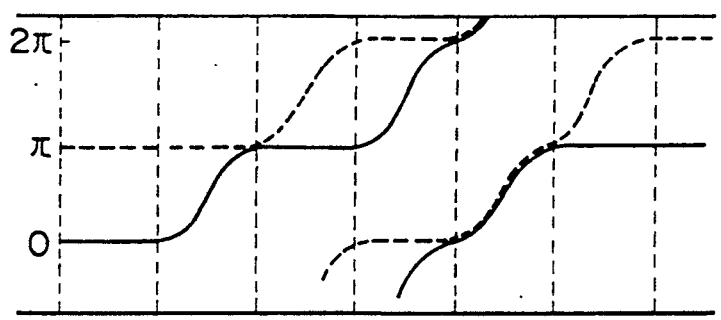

The light wave phase is an integral of frequency with time. Thus where the amplitude of the modulation current pulses is appropriately determined, the phase change in a time slot corresponding to a signal "1" is $\pi$, as shown in FIG. 3B. The MZ optical interferometer 8 causes this light to interfere in the same amplitude with the other portion of light delayed by one time slot. The phase of the light delayed by one time slot is represented by broken lines in FIG. 3B. In the above setup, the initial phase of the delayed light is set to zero or to $\pi$ (in FIG. 3B, the initial phase is set to $\pi$).

Figure 3C:
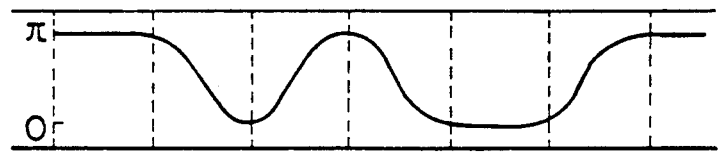
Figure 3D:
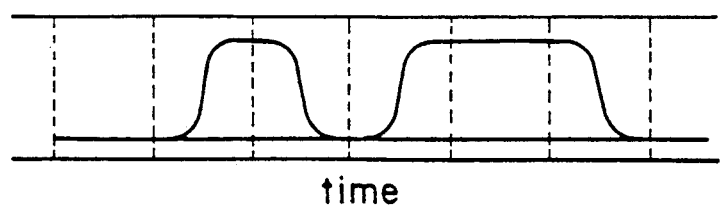

The output intensity of the MZ optical interferometer 8 is determined by the relative phase difference between the two interfering portions of light. In FIG. 3B, the relative phase difference is the difference between solid and broken lines. The phase difference thus turns out to be as illustrated in FIG. 3C, varying between zero and $\pi$ in accordance with the input signal. As a result of the interference, the optical output is maximized when the phase difference is zero; the optical output is zero when the phase difference is $\pi$. Thus the intensity waveform of the optical output is as depicted in FIG. 3D.

While the output waveform varies in keeping with the input signal, there exists a time delay corresponding to a half time slot between the output and input signals. The output waveform is an NRZ type regardless of the duty ratio of the RZ input signal. The duty ratio of the input signal determines the rise and fall times for the output waveform.

Figure 4A:
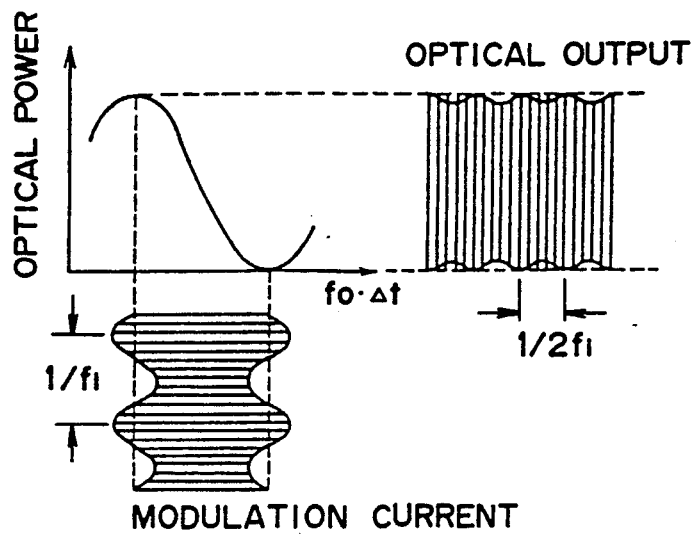
FIGS. 4A through 4C are views illustrating how the operating point is controlled.
Figure 4B:
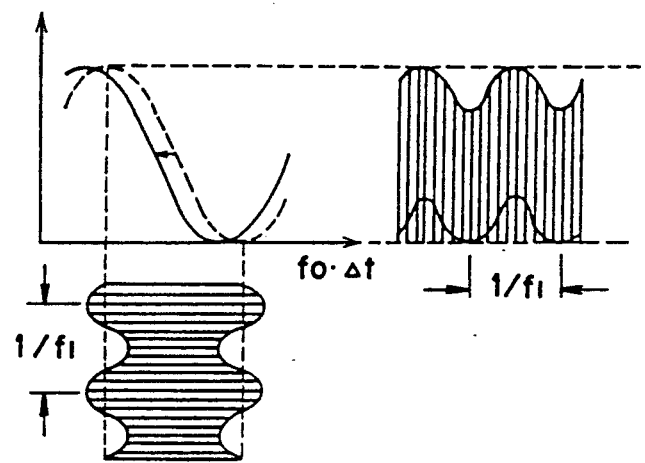
Figure 4C:
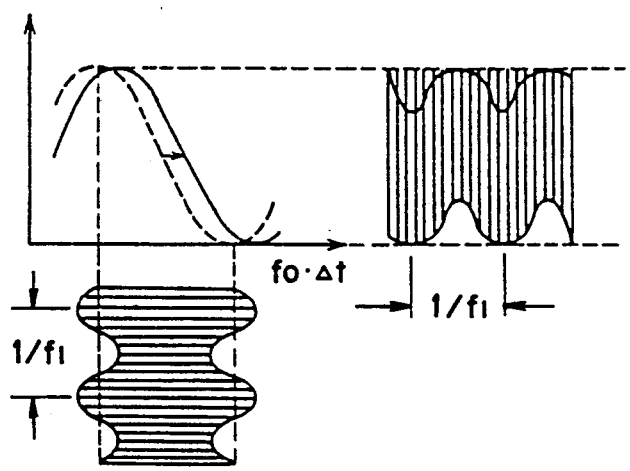

FIGS. 4A through 4C serve to explain how the operating point is controlled. In these figures, the ordinate represents optical power levels, and the abscissa denotes th product of the oscillation frequency (fo) of the laser diode 2 and the delay time difference between the first and the second optical paths ($\Delta\tau = \tau_2 - \tau_1$) in the MZ optical interferometer 8. FIG. 4A shows a case in which the operating point is appropriate; FIG. 4B is a case in which the operating point has drifted in the negative direction; and FIG. 4C is a case wherein the operating point has drifted in the positive direction.

Where the DPSH-IM is applied, the optical power responds periodically to the product $(f_o \cdot \Delta\tau)$. Specifically, the response takes place as follows:

If it is assumed that the electric field of the light entering the MZ optical interferometer 8 is given as $$E_{in}(t) = E_o \cos(2\pi f_o t)$$

that the electric field of the light output by the MZ optical interferometer 8 is $$E_{out}(t)$$

and that the power of the light output by the MZ optical interferometer is $$S_{out}$$

Then one gets $$\begin{aligned}E_{out}(t) &= \tfrac{1}{2}\cdot[E_{in}(t-\tau_1)+E_{in}(t-\tau_2)] \\ &= \tfrac{1}{2}\cdot[E_0\cos(2\pi f_0(t-\tau_1))+ \\ &\quad E_0\cos(2\pi f_0(t-\tau_2))] \\ &= 1/(2)^{\tfrac{1}{2}}\cdot E_0[1+\cos(2\pi f_0(\tau_2-\tau_1))]^{\tfrac{1}{2}}\cdot \\ &\quad \cos(2\pi f_0 t - \phi)\end{aligned}$$

where, $$\phi = \tan^{-1}[(\sin(2\pi f_0\tau_1)+\sin(2\pi f_0\tau_2))/(\cos(2\pi f_0\tau_1)+\cos(2\pi f_0\tau_2))]$$

$$S_{out} = \tfrac{1}{2}\cdot E_0^2[1+\cos(2\pi f_0(\tau_2-\tau_1))]$$

As indicated, the optical output power $S_{out}$ responds periodically in the form of a sine wave curve to the product of the oscillation frequency $f_o$ and the delay time difference $\Delta\tau$.

FIGS. 4A through 4C show that the amplitude of high speed modulation current pulses is modulated using the first low frequency signal (frequency: $f_1$) so that the envelope on the space side is symmetrically positioned relative to the envelope on the mark side. In other words, amplitude modulation is carried out in such a manner that in the modulation current waveform, the envelope on the space side and that on the mark side are opposite to each other in phase and have the same amplitude. In this setup, a drift of the operating point causes the low frequency component having the frequency $f_1$ to emerge in the optical output waveform. The polarity of the low frequency component is determined by the direction of drift of the operating point. If the operating point is optimum, the low frequency component is zero. Thus an optimum operating point is maintained by first extracting the low frequency component from the output signal light, and by controlling the oscillation frequency of the laser diode and/or the delay time difference of the MZ optical interferometer so as to bring the amplitude of the low frequency component to zero. The control direction is known from the polarity of the low frequency component extracted.

The oscillation frequency of the laser diode is varied using parameters on which that frequency depends, such as the bias current supplied to the laser diode or the temperature of that diode. The delay time difference of the MZ optical interferometer is varied illustratively in two ways: by applying asymmetrical temperature changes to the first and the second optical paths of the interferometer; or by forming the first and the second optical paths as branch wave guides on an electro-optical crystal substrate and applying asymmetrical electric fields to these branch wave guides.

Figure 5A:
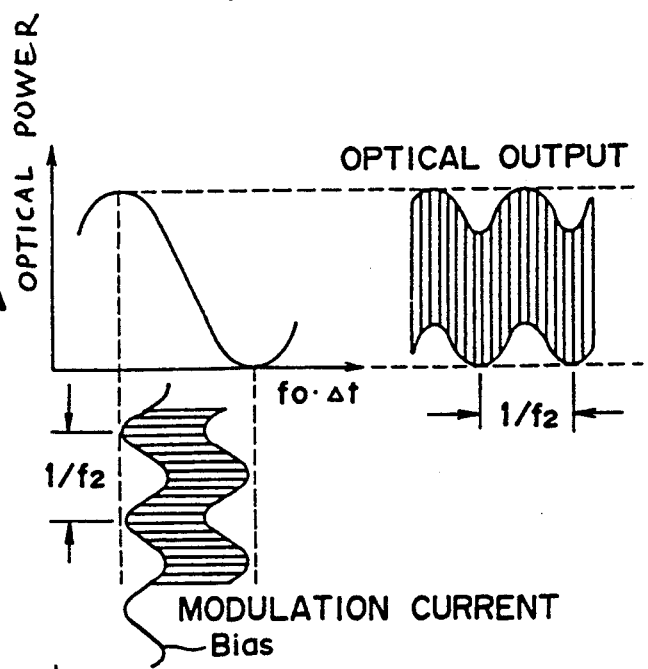
FIGS. 5A through 5C are views showing how driving amplitude is controlled.
Figure 5B:
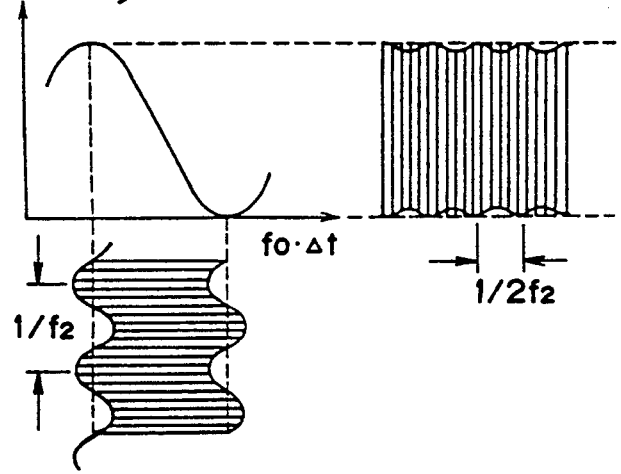
Figure 5C:
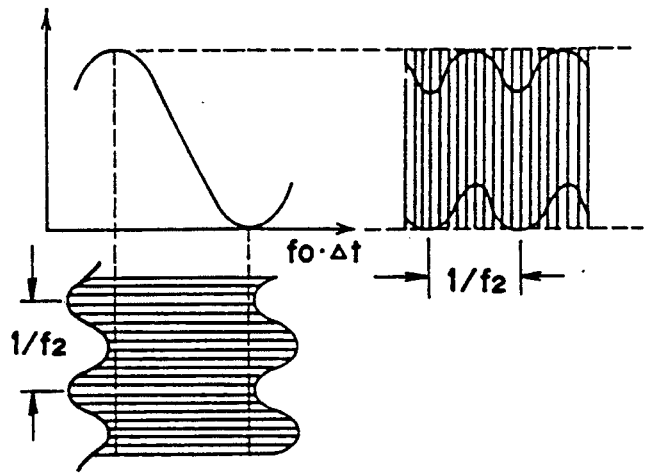

FIGS. 5A through 5C are used to illustrate how driving amplitude is controlled. The axes of ordinate and abscissa along which operation characteristic curves are given in FIGS. 5A through 5C are the same as those in FIGS. 4A through 4C. FIG. 5A represents a case wherein the driving amplitude is smaller than optimum; FIG. 5B is a case in which the driving amplitude is optimum; and FIG. 5C is a case where the driving amplitude is greater than optimum. When the bias current of the laser diode 2 is modulated using the second low frequency signal (frequency: $f_2$), a drift of the driving amplitude from its optimum value causes the low frequency component having the frequency $f_2$ (not the same as $f_1$) to appear in the optical output waveform. If the driving amplitude is too large or too small, the polarity of the detected low frequency component is inverted. Where the driving amplitude is optimum, no low frequency component is detected. Thus if the low frequency component contained in the signal light is extracted therefrom, and the driving amplitude is controlled so as to bring the component to zero, then the driving amplitude is maintained at its optimum value. As a result, waveform distortion and other adverse effects are prevented. The direction of control is known from the polarity of the extracted low frequency component.

Figure 6:
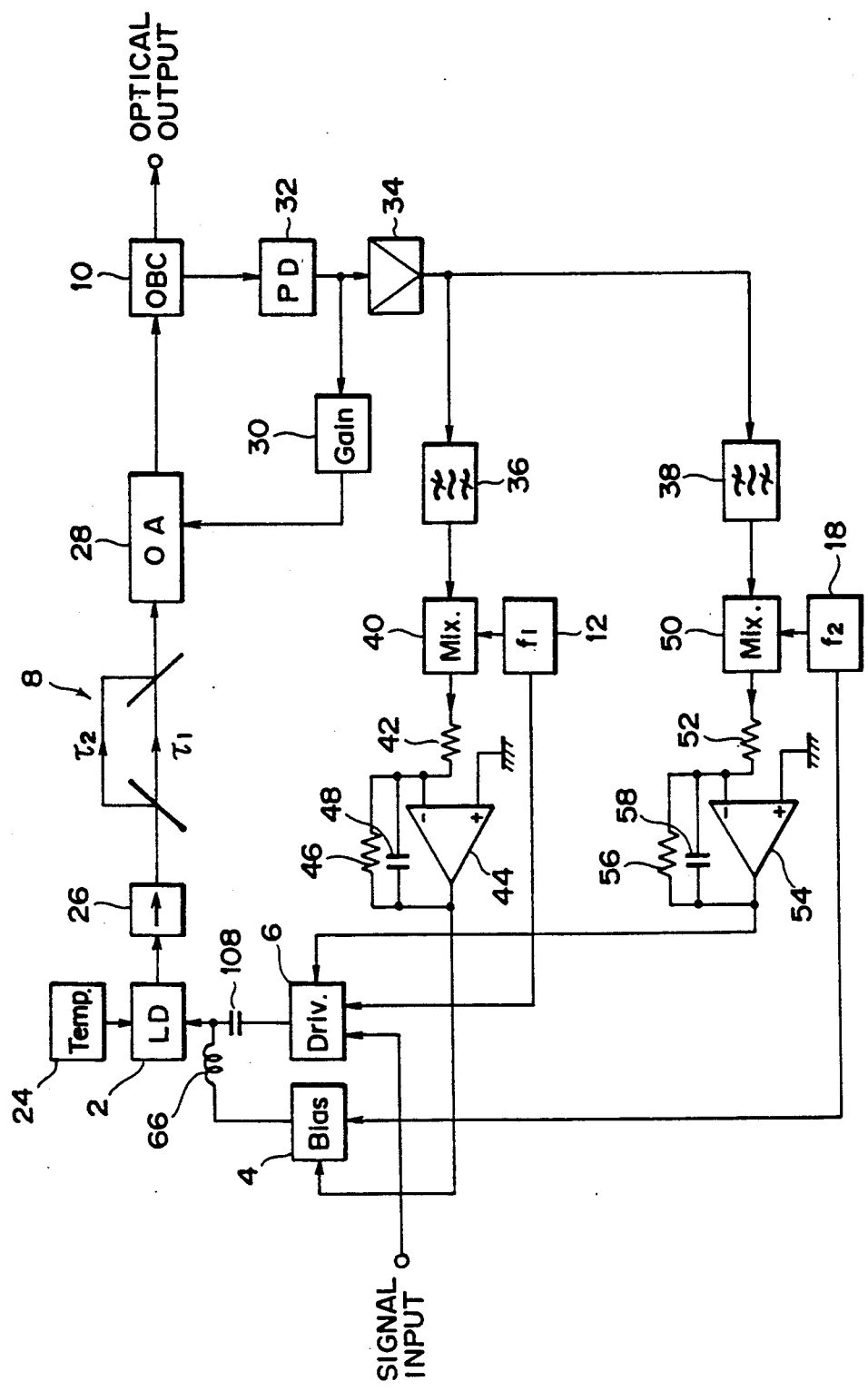
FIG. 6 is a block diagram depicting in more detail the first embodiment of FIG. 1.

FIG. 6 is a more detailed block diagram of the optical transmitter shown in FIG. 1. The laser diode 2, bias circuit 4, driving circuit 6, MZ optical interferometer 8, optical branching circuit 10, first oscillator 12 and second oscillator 18 in FIG. 6 are the same in terms of connection and function as those discussed with reference to FIG. 1, and any repetitive description thereof will be omitted.

Reference numeral 24 is a temperature stabilizing circuit containing a Peltier device or the like. The temperature stabilizing circuit 24 keeps the temperature of the laser diode 2 constant. An optical isolator 26 prevents reflected feedback light from entering the laser diode 2. An optical amplifier 28, located upstream of the optical branching circuit 10, has its gain controlled by a gain control circuit 30. A photodetector 32 detects the intensity of the light branched by the optical branching circuit 10. The detected signals by the photodetector 32 are forwarded to an amplifier 34 and to the gain control circuit 30. The gain control circuit 30 controls the gain of the optical amplifier 28 in such a way that the level of light reception by the photodetector 32 is kept constant. An optical fiber amplifier or a laser diode type optical amplifier may be used as the optical amplifier 28.

The output of the amplifier 34 is input to band-pass filters 36 and 38. The band-pass filter 36 allows the frequency component having the frequency $f_1$ to pass, and the band-pass filter 38 lets the frequency component having the frequency $f_2$ pass therethrough. A multiplier 40 multiplies the output of the band-pass filter 36 by the low frequency signal coming from the first oscillator 12. The polarity (positive or negative) of the output from the multiplier 40 represents the direction of drift of the operating point. The absolute value of the output level of the multiplier 40 is approximately proportionate to the amount of drift of the operating point. The output of the multiplier 40 is input to the negative side input port of an operation amplifier 44 via a resistance 42. The positive side input port of the operation amplifier 44 is connected to ground, A control signal from the operation amplifier 44 is input to the bias circuit 4. A resistance 46 and a capacitor 48 are connected in parallel between the negative side input and output ports of the operation amplifier 44. The capacitor 48 determines the time constant of the feedback loop formed by the operating point control circuit.

Meanwhile, the signal that has passed through the band-pass filter 38 is multiplied in a multiplier 50 by the low frequency signal from the second oscillator 18, The output of the multiplier 50 is input to the negative side input port of an operation amplifier 54 via a resistance 52. The polarity (positive or negative) of the output from the multiplier 0 indicates whether the driving amplitude is too large or too small. The absolute value of the level of output from the multiplier 50 is appropriately proportionate to the amount of drift from the optimum driving amplitude. A control signal from the operation amplifier 54 is input to the driving circuit 6. The positive side input port of the operation amplifier 54 is connected to ground. A resistance 56 and a capacitor 58 are connected in parallel between the negative side input and output ports of the operation amplifier 54. The capacitor 58 determines the time constant of the feedback loop formed by the driving amplitude control circuit.

In the first embodiment described, the photodetector 32, amplifier 34, band-pass filter 36 and multiplier 40 perform the function of the first amplitude detector 14; the operation amplifier 44 and the circuits associated therewith perform the function of the operating point control circuit 16; the photodetector 32, amplifier 34, band-pass filter 38 and multiplier 50 perform the function of the second amplitude detector 20; and the operation amplifier 54 and the circuits associated therewith perform the function of the driving amplitude control circuit 22.

Driving amplitude control presupposes that the operating point is controlled relative to an optimum value. Thus the time constant of the feedback loop formed by the operating point control circuit should preferably be set to be smaller than the time constant of the feedback loop by the driving amplitude control circuit.

Figure 7:
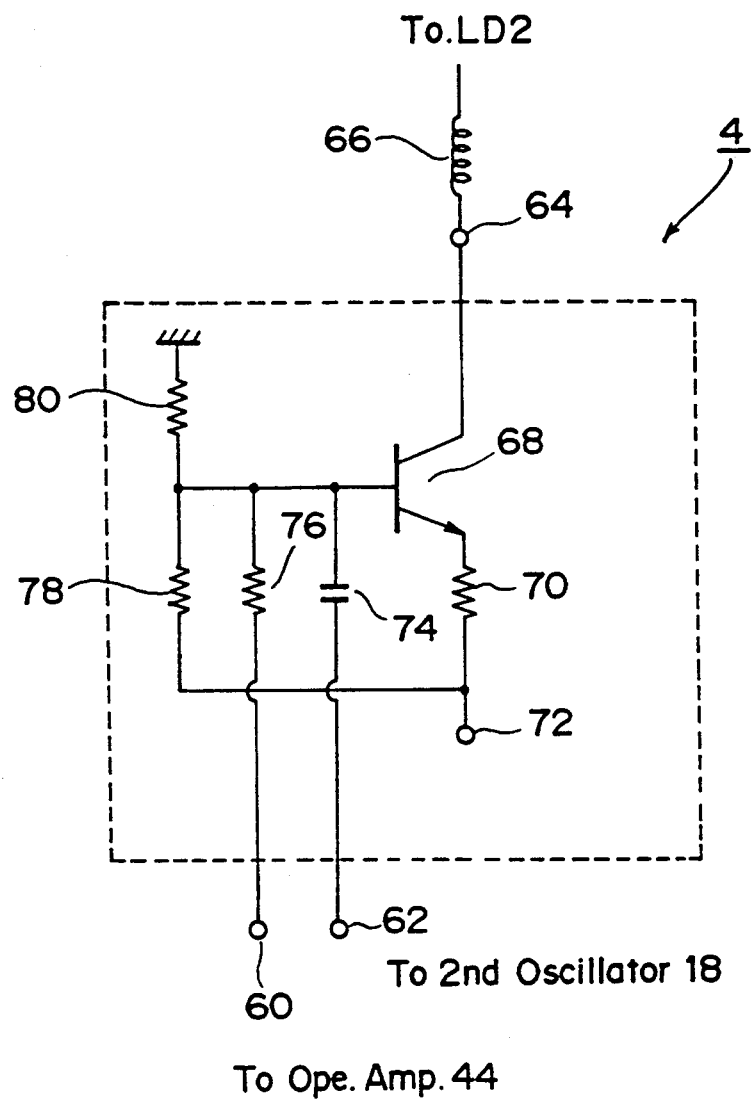
FIG. 7 is a circuit diagram of a bias circuit included in the first embodiment.

FIG. 7 is a circuit diagram of the bias circuit 4. In FIG. 7, reference numeral 60 is an input port that receives the control signal from the operation amplifier 44; 62 is an input port that receives the second low frequency signal; and 64 is an output port that outputs the bias current. The bias current is supplied to the laser diode via an inductor 66. The output port 64 is connected to the collector of a transistor 68. The emitter of the transistor 68 is connected to a power input port 72 via a resistance 70. The second low frequency signal that has entered the input port 62 is input to the base of the transistor 68 via a capacitor 74. The control signal that has entered the input port 60 is input to the base of the transistor 68 via a resistance 76. A resistance 78 is interposed between the base of the transistor 68 and the power input port 72. The base of the transistor 68 is connected to ground via a resistance 80.

Figure 8:
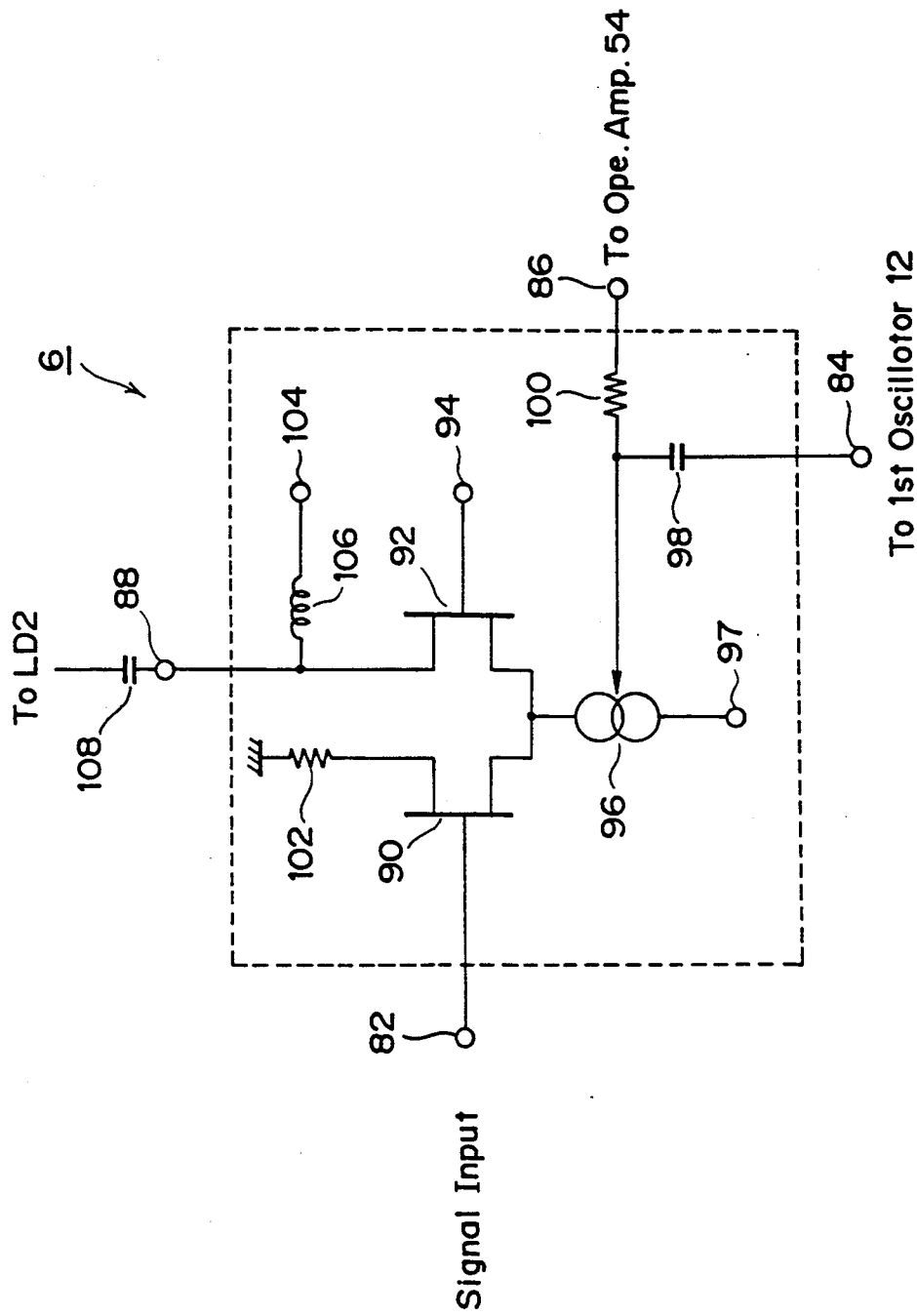
FIG. 8 is a circuit diagram of a driving circuit included in the first embodiment.

FIG. 8 is a circuit diagram of the driving circuit 6. In FIG. 8, reference numeral 82 is a signal input port; 84 is an input port that receives the first low frequency signal; 86 is an input port that receives the control signal from the operation amplifier 54; and 88 is a output port that outputs the modulation current. A signal that has entered the signal input port 82 is input to the gate of an FET 90. The gate of an FET 92 receives a reference voltage from a power input port 94. A current source 96 is positioned between the source of the FET 90, the source of the FET 92, and a power input port 97. The first low frequency signal that has entered the input port 84 is input to the current source 96 via a capacitor 98. The control signal that has entered the input port 86 is input to the current source 96 via a resistance 100. The drain of the FET 90 is connected to ground via a resistance 102. The drain of the FET 92 is connected to a power input port 104 via an inductor 106.

The modulation current output by the output port 88 is fed to the laser diode 2 via a decoupling capacitor 108. The first function of the decoupling capacitor 108 is to disconnect the bias current directed to the driving circuit 6. The second function of the decoupling capacitor 108 is to amplitude-modulate the modulation current using the first low frequency signal in such a manner that the space side envelope and mark side envelope of the modulation current will become symmetrical. That is, the decoupling capacitor 108 is used to remove the frequency component of the first low frequency signal from the asymmetrically amplitude-modulated modulation current. This causes the space side and mark side envelopes in the modulation current waveform to become opposite to each other in phase and to have the same amplitude.

In the setup of FIG. 6, the optical amplifier 28 is located upstream of the optical branching circuit 10, wherein the controlled gain is used to amplify the signal light. This provides not only the benefit of high output but also the advantages. One such advantage is this: With conventional bias control in which the bias current of the laser diode is generally controlled so as to maintain a constant optical output level, an optimum operating point cannot be obtained by the DPSH-IM method because the oscillation frequency of the laser diode varies in keeping with changes in the bias current. By contrast, the invention maintains an optimum operating point and ensures a constant optical output level illustratively by carrying out APC through the gain of the optical amplifier.

Figure 9A:
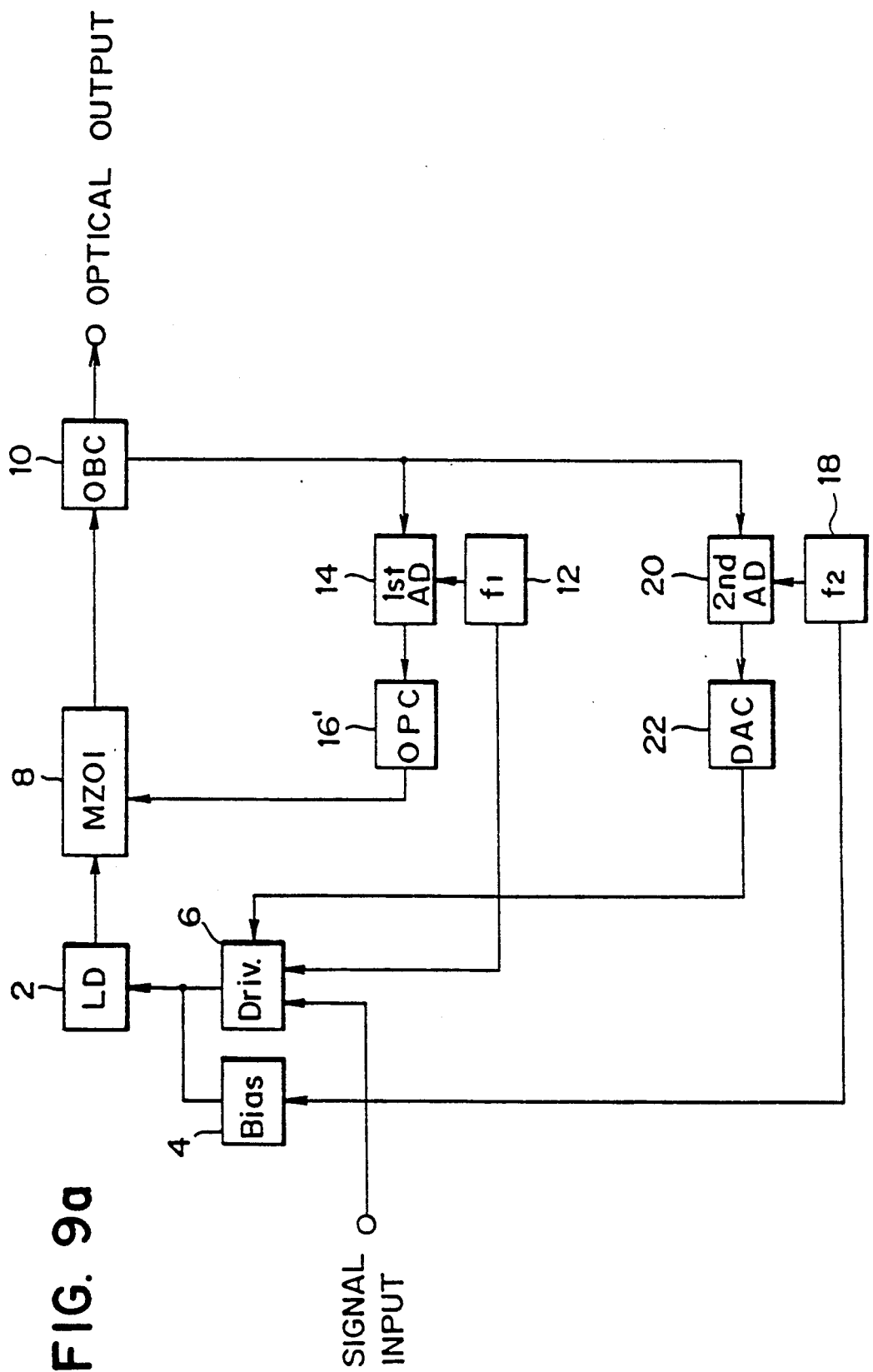
FIGS. 9A and 9B are a block diagram of an optical transmitter practiced as a second embodiment of the invention.

FIG. 9A is a block diagram of another optical transmitter practiced as the second embodiment of the invention. What differentiates the second embodiment from the first is that the second embodiment adopts, as the target of control by the operating point control circuit 16 (16'), the delay time difference of the MZ optical interferometer 8 in place of the bias current of the laser diode. In this setup, the delay time difference of the optical interferometer may be varied illustratively in three ways: by utilizing the electro-optical effect, by relying on dynamics involving a piezoelectric device, or by using thermal expansion with a Peltier device.

Figure 9B:
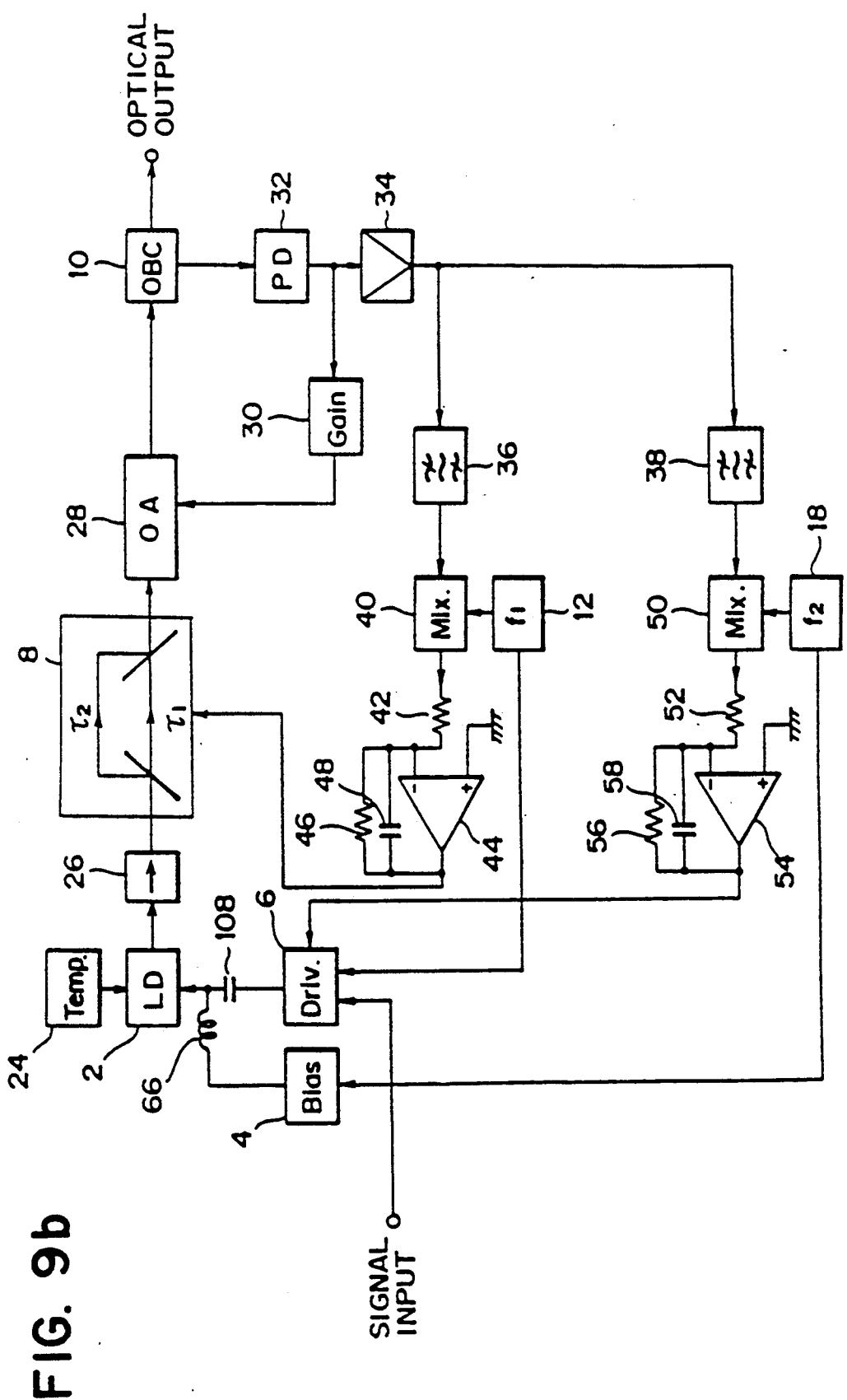

FIG. 9B is a more detailed block diagram of the optical transmitter shown in FIG. 9A. FIG. 9B corresponds with FIG. 6 of the first embodiment with respect to all circuit elements and the interconnection thereof with the exception of the control signal from the operation amplifier 44. In FIG. 6 of the first embodiment, the control signal from the operation amplifier 44 was input to the bias circuit 4. However, in FIG. 9B of the second embodiment, the control signal from the operation amplifier 44 is input to the Mach-Zehnder optical interferometer 8. A repetitive description of these circuit elements and interconnection thereof which does correspond with FIG. 6 will be omitted.

In this manner, the second embodiment optimally controls the operating point and amplitude in an optical transmitter operating on the DPSH-IM principle. Although neither the optical amplifier nor the APC control loop is shown, these components may be included in the second embodiment as in the first. In the first and the second embodiments, the optical amplifier may be positioned upstream of the MZ optical interferometer 8.

Figure 10:
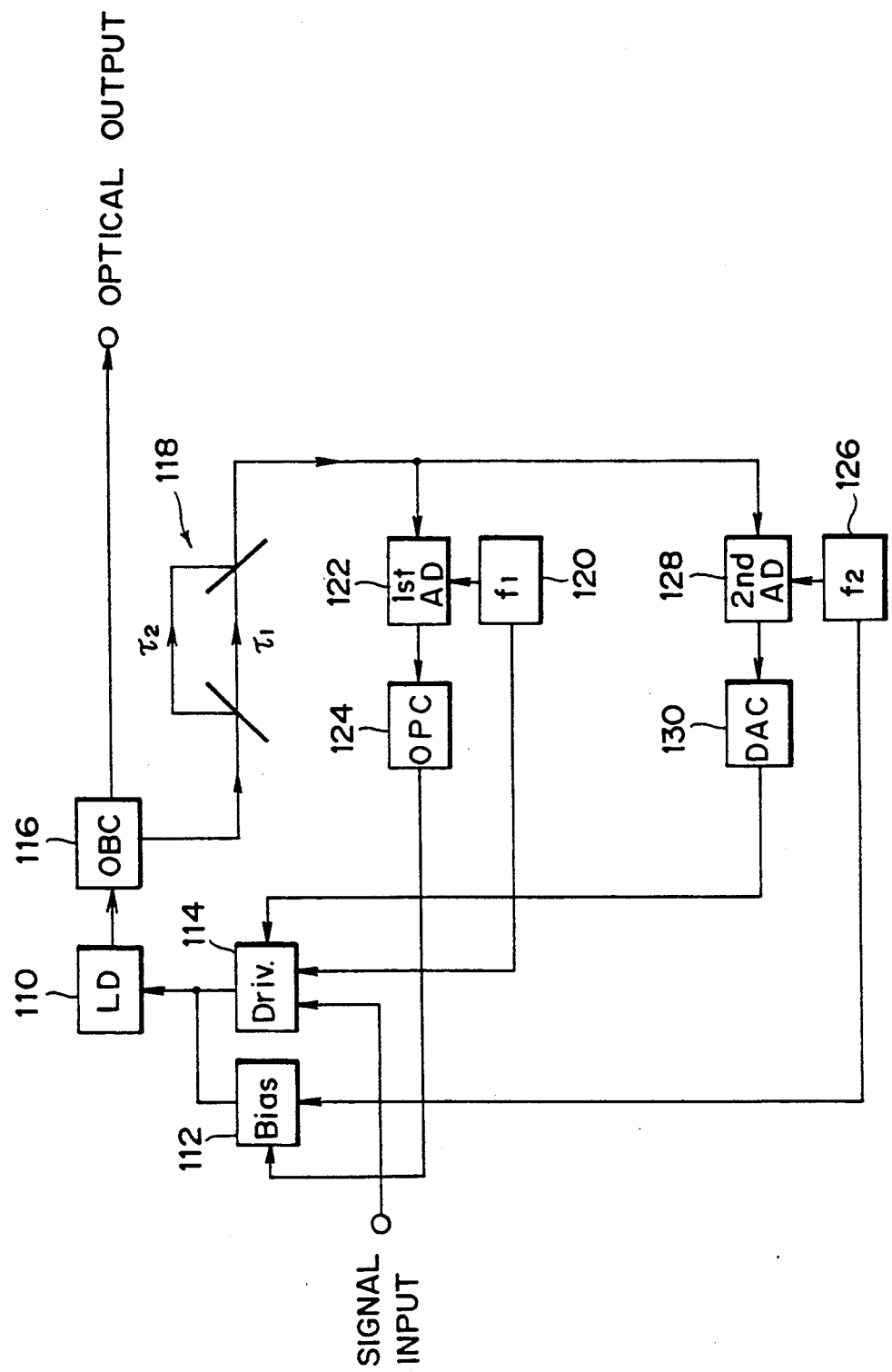
FIG. 10 is a block diagram of an optical transmitter practiced as a third embodiment of the invention.

Below is a description of how this invention may be applied to coherent light wave communication. FIG. 10 is a block diagram of another optical transmitter practiced as the third embodiment for coherent light wave communication. The third embodiment comprises a laser diode 110; a bias circuit 112 that feeds a bias current to the laser diode 110; a driving circuit 114 that supplies the laser diode 110 with a modulation current as per an input signal in order to frequency- or phase-modulate that diode; an optical branching circuit 116 that branches the signal light from the laser diode 110; an MZ optical interferometer 118 that converts the signal light branched by the optical branching circuit 116 into intensity-modulated light; a first oscillator 120 that slightly amplitude-modulates the modulation current using a first low frequency signal; a first amplitude detector 122 that detects the amplitude and polarity of the frequency component of the first low frequency signal contained in the intensity-modulated light from the MZ optical interferometer 118; an operating point control circuit 124 that increases or decreases the bias current depending o the polarity detected by the first amplitude detector 122, whereby control is effected in such a manner that the amplitude detected by the first amplitude detector 122 reaches zero; a second oscillator 126 that slightly modulates the bias current using a second low frequency signal having a frequency different from that of the first low frequency signal; a second amplitude detector 128 that detects the amplitude and polarity of the frequency component of the second low frequency signal contained in the intensity-modulated light from the MZ optical interferometer 118; and a driving amplitude control circuit 130 that increases or decreases the amplitude of the modulation current depending on the polarity detected by the second amplitude detector 128, whereby control is effected in such a manner that the amplitude detected by the second amplitude detector 128 reaches zero.

The method of modulation applicable to the driving circuit 114 may be the CPFSK, DPSK, or equivalent. As with the first and the second embodiments, the third embodiment may have an optical amplifier located upstream or downstream of the optical branching circuit 116 to form an APC loop.

The construction of the third embodiment stabilizes the driving amplitude of the optical transmitter for coherent light wave communication. As a result, the optical transmitter keeps the modulation factor constant for frequency or phase modulation. In the third embodiment, both the operating point and the driving amplitude are controlled. This is because making the feedback loop for driving amplitude control properly function presupposes stabilization of the operating point.

Figure 11:
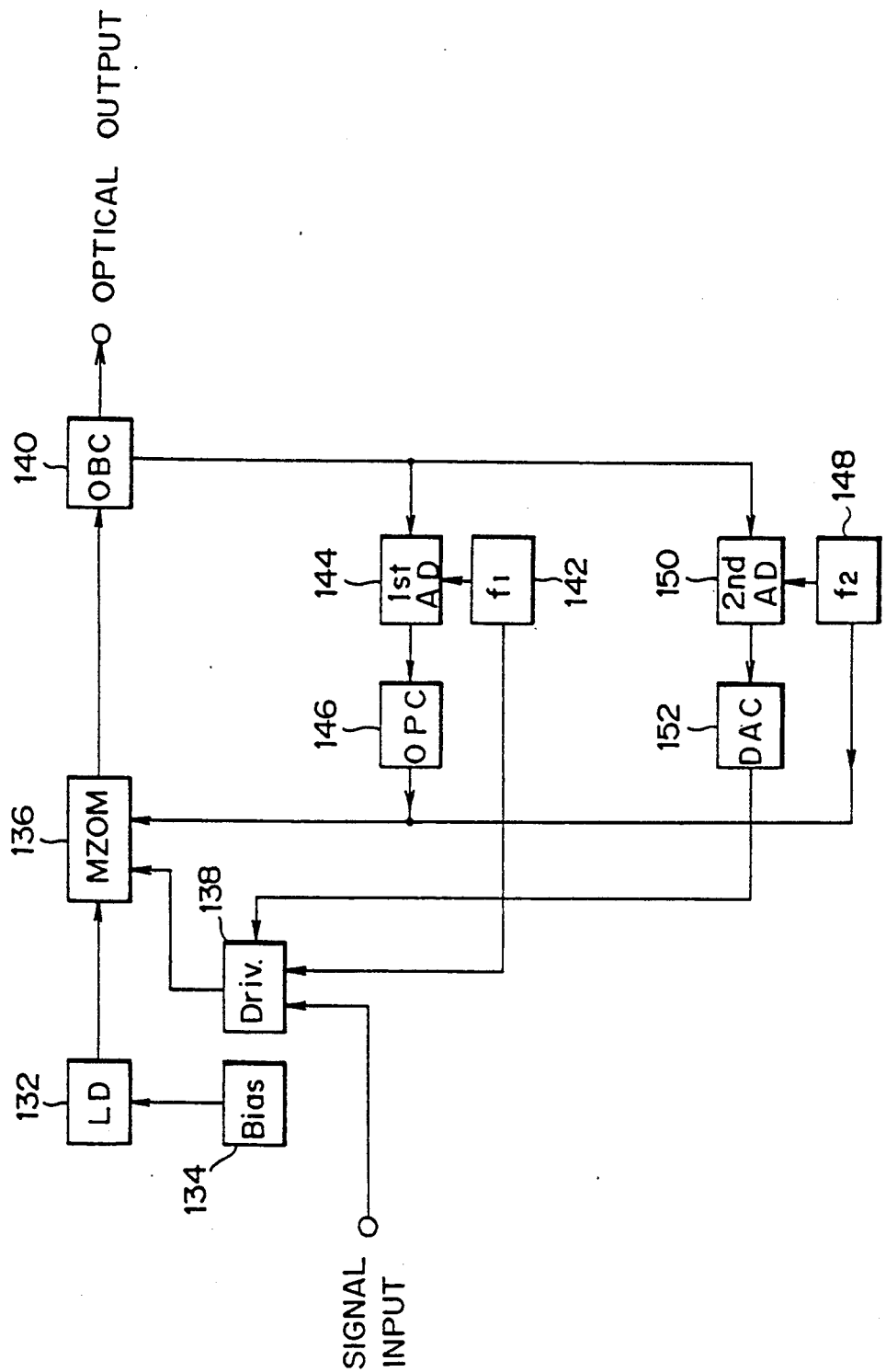
FIG. 11 is a block diagram of an optical transmitter practiced as a fourth embodiment of the invention.

FIG. 11 is a block diagram of yet another optical transmitter practiced as the fourth embodiment of the invention. This optical transmitter comprises a laser diode 132; a bias circuit 134 that feeds a bias current to the laser diode 132; a Mach-Zehnder (MZ) optical modulator 136 that intensity-modulates the light from the laser diode 132; a driving circuit 138 that supplies the MZ optical modulator with a modulation signal as per an input signal; an optical branching circuit 140 that branches the signal light from the MZ optical modulator 136; a first oscillator 142 that slightly amplitude-modulates the modulation signal of the MZ optical modulator using a first low frequency signal; a first amplitude detector 144 that detects the amplitude and polarity of the frequency component of the first low frequency signal contained in the signal light branched by the optical branching circuit 140; an operating point control circuit 146 that increases or decreases the bias voltage of the MZ optical modulator 136 depending on the polarity detected by the first amplitude detector 144, whereby control is effected in such a manner that the amplitude detected by the first amplitude detector 144 reaches zero; a second oscillator 148 that slightly modulates the bias voltage of the MZ optical modulator 136 using a second low frequency signal having a frequency different from that of the first low frequency signal; a second amplitude detector 150 that detects the amplitude and polarity of the frequency component of the second low frequency signal contained in the signal light branched by the optical branching circuit 140; and a driving amplitude control circuit 152 that increases or decreases the amplitude of the modulation signal fed to the MZ optical modulator depending on the polarity detected by the second amplitude detector 150, whereby control is effected in such a manner that the amplitude detected by the second amplitude detector 150 reaches zero.

In the fourth embodiment, the optical output responds periodically to the bias voltage of the MZ optical modulator 136. This is what differentiates the fourth embodiment from the DPSH-IM type optical transmitter in which the optical output responds periodically to the product of the oscillation frequency of the laser diode and the delay time difference of the MZ optical interferometer. In the fourth embodiment, the object of control by the operating point control circuit 146 is th bias voltage of the MZ optical modulator 136, and the object of control by the driving amplitude control circuit 152 is the amplitude of the modulation signal to the MZ optical modulator 136. These features derive from the above-mentioned differentiating point between the fourth embodiment and the other embodiments. Where an APC loop is added to the fourth embodiment, the target of control thereby may be the bias current of the laser diode 132.

Furthermore, the ability of the fourth embodiment to control the operating point and driving amplitude in an optimum manner effectively prevents transmission waveform deterioration.

Although the description above contains many specificities, these should not be construed as limiting the scope of the invention but as merely providing illustrations of some of the presently preferred embodiments of this invention. For example, the optical transmitter of FIG. 1 and that of FIG. 6 are each provided with both the feedback loop for operating point control and the feedback loop for driving amplitude control. An alternative to this arrangement is to omit the feedback loop for driving amplitude control if there is no possibility that the frequency modulation efficiency of the laser diode would vary.

Thus the scope of the invention should be determined by the appended claims and their legal equivalents, rather than by the examples given.

What is claimed is:

1. An optical transmitter comprising:
   a laser diode;
   a bias circuit for supplying a bias current to said laser diode;
   a driving circuit for supplying said laser diode with a modulation current in accordance with an input signal, said modulation current being supplied in such a manner that the integral value of the oscillation frequency of said laser diode, varied in one time slot by said modulation current, reaches a phase amount of one of $k_\pi$ and $-k_\pi$, k being at least 1;

a Mach-Zehnder optical interferometer for converting angle-modulated light coming from said laser diode into intensity-modulated light, the interferometer having a delay time difference corresponding to 1/k of one time slot;

an optical branching circuit for branching the signal light from said Mach-Zehnder interferometer;

a first oscillator for slightly amplitude-modulating said modulation current using a first low frequency signal;

a first amplitude detector for detecting the amplitude and polarity of the frequency component of said first low frequency signal contained in the signal light branched by said optical branching circuit; and an operating point control circuit for increasing or decreasing, depending on the polarity detected by said first amplitude detector, the phase difference given upon interference by multiplying said oscillation frequency by said delay time difference, whereby control of said bias current is effected so that the amplitude detected by said first amplitude detector reaches zero.

2. An optical transmitter according to claim 1, wherein said modulation current is amplitude-modulated using said first low frequency signal in such a manner that in the waveform of said modulation current, the envelope on the space side and the envelope on the mark side are opposite to each other in phase and are the same in amplitude.

3. An optical transmitter according to claim 2, wherein said modulation current is fed to said laser diode via a decoupling capacitor for removing the frequency component of said first low frequency signal.

4. An optical transmitter according to claim 3, wherein said first amplitude detector includes:
   a light receiving device for converting into an electrical signal the signal light branched by said optical branching circuit;
   a band-pass filter for receiving the output of said light receiving device and letting pass the frequency component of said first low frequency signal; and
   a multiplier for mixing the output of said band-pass filter with said first low frequency signal output by said first oscillator,
   and wherein said operating point control circuit includes an operation amplifier for effecting feedback control on said bias current in such a manner that the direct current output of said multiplier reaches zero.

5. An optical transmitter according to claim 1, further comprising an optical amplifier interposed between said laser diode and said optical branching circuit, the gain of said optical amplifier being controlled in such a manner that the optical output power from said optical branching circuit becomes constant.

6. An optical transmitter according to claim 1, further comprising:
   a second oscillator for slightly modulating said bias current using a second low frequency signal having a frequency different from that of said first low frequency signal;
   a second amplitude detector for detecting the amplitude and polarity of the frequency component of said second low frequency signal contained in the signal light branched by said optical branching circuit; and
   a driving amplitude control circuit for increasing or decreasing the amplitude of said modulation current depending on the polarity detected by said second amplitude detector, whereby control of said modulation current is effected so that the amplitude detected by said second amplitude detector reaches zero.

7. An optical transmitter according to claim 6, wherein said modulation current is amplitude-modulated using said first low frequency signal in such a manner that in the waveform of said modulation current, the envelope on the space side and the envelope on the mark side are opposite to each other in phase and are the same in amplitude.

8. An optical transmitter according to claim 7, wherein said modulation current is fed to said laser diode via a decoupling capacitor for removing the frequency component of said first low frequency signal.

9. An optical transmitter according to claim 8, wherein said first amplitude detector includes:
   a light receiving device for converting into an electrical signal the signal light branched by said optical branching circuit;
   a first band-pass filter for receiving the output of said light receiving device and letting pass the frequency component of said first low frequency signal; and
   a first multiplier for mixing the output of said first band-pass filter with said first low frequency signal output by said first oscillator,
   wherein said operating point control circuit includes a first operation amplifier for effecting feedback control on said bias current in such a manner that the direct current output of said first multiplier reaches zero,
   wherein said second amplitude detector includes:
   a second band-pass filter for receiving the output of said light receiving device of said first amplitude detector and letting pass the frequency component of said second low frequency signal; and
   a second multiplier for mixing the output of said second band-pass filter with said second low frequency signal output by said second oscillator, and
   wherein said driving amplitude control circuit includes a second operation amplifier for effecting feedback control on the amplitude of said modulation current in such a manner that the direct current output of said second multiplier reaches zero.

10. An optical transmitter according to claim 9, wherein the time constant of the feedback loop formed by said operating point control circuit is smaller than the time constant of the feedback loop by said driving amplitude control circuit.

11. An optical transmitter comprising:
   a laser diode;
   a bias circuit for supplying a bias current to said laser diode;
   a driving circuit for supplying said laser diode with a modulation current in accordance with an input signal, said modulation current being supplied in such a manner that said laser diode is frequency-modulated or phase-modulated;
   an optical branching circuit for branching the signal light from said laser diode;

a Mach-Zehnder optical interferometer for converting the signal light branched by said optical branching circuit into intensity-modulated light;

a first oscillator for slightly amplitude-modulating said modulation current using a first low frequency signal;

a first amplitude detector for detecting the amplitude and polarity of the frequency component of said first low frequency signal contained in the intensity-modulated light from said Mach-Zehnder optical interferometer;

an operating point control circuit for increasing or decreasing said bias current depending on the polarity detected by said first amplitude detector, whereby control is effected of said bias current so that the amplitude detected by said first amplitude detector reaches zero;

a second oscillator for slightly modulating said bias current using a second low frequency signal having a frequency different from that of said first low frequency signal;

a second amplitude detector for detecting the amplitude and polarity of the frequency component of said second low frequency signal contained in the intensity-modulated light from said Mach-Zehnder optical interferometer; and a driving amplitude control circuit for increasing or decreasing the amplitude of said modulation current depending on the polarity detected by said second amplitude detector, whereby control is effected so that the amplitude detected by said second amplitude detector reaches zero.

12. An optical transmitter comprising:
a laser diode;
a bias circuit for supplying a bias current to said laser diode;
a Mach-Zehnder optical modulator for intensity-modulating the light from said laser diode;
a driving circuit for supplying said Mach-Zehnder optical modulator with a modulation signal in accordance with an input signal;
an optical branching circuit for branching the signal light from said Mach-Zehnder optical modulator;
a first oscillator for slightly amplitude-modulating said modulation signal for said Mach-Zehnder optical modulator using a first low frequency signal;
a first amplitude detector for detecting the amplitude and polarity of the frequency component of said first low frequency signal contained in the signal light branched by said optical branching circuit;
an operating point control circuit for increasing or decreasing the bias voltage of said Mach-Zehnder optical modulator depending on the polarity detected by said first amplitude detector, whereby control is effected so that the amplitude detected by said first amplitude detector reaches zero;
a second oscillator for slightly modulating the bias voltage of said Mach-Zehnder optical modulator using a second low frequency signal having a frequency different from that of said first low frequency signal;
a second amplitude detector for detecting the amplitude and polarity of the frequency component of said second low frequency signal contained in the signal light branched by said optical branching circuit; and
a driving amplitude control circuit for increasing or decreasing the amplitude of said modulation signal fed to said Mach-Zehnder optical modulator depending on the polarity detected by said second amplitude detector, whereby control is effected so that the amplitude detected by said second amplitude detector reaches zero.

13. An optical transmitter according to claim 6, further comprising an optical amplifier interposed between said laser diode and said optical branching circuit, the gain of said optical amplifier being controlled in such a manner that the optical output power from said optical branching circuit becomes constant.

14. An optical transmitter comprising:
a laser diode;
a bias circuit for supplying a bias current to said laser diode;
a driving circuit for supplying said laser diode with a modulation current in accordance with an input signal, said modulation current being supplied in such a manner that the integral value of the oscillation frequency of said laser diode, varied in one time slot by said modulation current, reaches a phase amount of one of $k_\pi$ and $-k_\pi$, k being at least 1;
a Mach-Zehnder optical interferometer for converting angle-modulated light coming from said laser diode into intensity-modulated light, the interferometer having a delay time difference corresponding to 1/k of one time slot;
an optical branching circuit for branching the signal light from said Mach-Zehnder interferometer;
a first oscillator for slightly amplitude-modulating said modulation current using a first low frequency signal;
a first amplitude detector for detecting the amplitude and polarity of the frequency component of said first low frequency signal contained in the signal light branched by said optical branching circuit; and
an operating point control circuit for increasing or decreasing, depending on the polarity detected by said first amplitude detector, the phase difference given upon interference by multiplying said oscillator frequency by said delay time difference, whereby control is effected of said time delay difference of said Mach-Zehnder optical interferometer so that the amplitude detected by said first amplitude detector reaches zero.

15. An optical transmitter according to claim 14 wherein said modulation current is amplitude-modulated using said first low frequency signal in such a manner that in the waveform of said modulation current, the envelope on the space side and the envelope on the mark side are opposite to each other in phase and are the same in amplitude.

16. An optical transmitter according to claim 15, wherein said modulation current is fed to said laser diode via a decoupling capacitor for removing the frequency component of said first low frequency signal.

17. An optical transmitter according to claim 14, further comprising:
a second oscillator for slightly modulating said bias current using a second low frequency signal having a frequency different from that of said first low frequency signal;
a second amplitude detector for detecting the amplitude and polarity of the frequency component of said second low frequency signal contained in the signal light branched by said optical branching circuit; and a driving amplitude control circuit for increasing or decreasing the amplitude of said modulation current depending on the polarity detected by said second amplitude detector, whereby control of said modulation current is effected so that the amplitude detected by said second amplitude detector reaches zero.

18. An optical transmitter according to claim 17, wherein said modulation current is amplitude-modulated using said first low frequency signal in such a manner that in the waveform of said modulation current, the envelope on the space side and the envelope on the mark side are opposite to each other in phase and are the same in amplitude.

19. An optical transmitter according to claim 18, wherein said modulation current is fed to said laser diode via a decoupling capacitor for removing the frequency component of said first low frequency signal.

20. An optical transmitter according to claim 19, further comprising an optical amplifier interposed between said laser diode and said optical branching circuit, the gain of said optical amplifier being controlled in such a manner that the optical output power from said optical branching circuit becomes constant.

21. An optical transmitter according to claim 14, further comprising an optical amplifier interposed between said laser diode and said optical branching circuit, the gain of said optical amplifier being controlled in such a manner that the optical output power from said optical branching circuit becomes constant.

* * * * *